(12) United States Patent
Yun

(10) Patent No.: US 10,734,614 B2
(45) Date of Patent: Aug. 4, 2020

(54) RECHARGEABLE BATTERY AND MODULE THEREOF

(71) Applicant: SAMSUNG SDI CO., LTD., Yongin-si, Gyeonggi-do (KR)

(72) Inventor: Jun-Seo Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1045 days.

(21) Appl. No.: 14/948,216

(22) Filed: Nov. 20, 2015

(65) Prior Publication Data

US 2016/0351862 A1 Dec. 1, 2016

(30) Foreign Application Priority Data

May 26, 2015 (KR) .................. 10-2015-0073083

(51) Int. Cl.
| | | |
|---|---|---|
| H01M 2/02 | (2006.01) | |
| H01M 2/20 | (2006.01) | |
| H01M 2/04 | (2006.01) | |
| H01M 2/06 | (2006.01) | |
| H01M 2/30 | (2006.01) | |

(52) U.S. Cl.
CPC ......... *H01M 2/024* (2013.01); *H01M 2/0207* (2013.01); *H01M 2/0456* (2013.01); *H01M 2/202* (2013.01); *H01M 2/02* (2013.01); *H01M 2/0217* (2013.01); *H01M 2/06* (2013.01); *H01M 2/20* (2013.01); *H01M 2/30* (2013.01)

(58) Field of Classification Search
None
See application file for complete search history.

(56) References Cited

U.S. PATENT DOCUMENTS

| | | | | |
|---|---|---|---|---|
| 3,147,151 | A * | 9/1964 | Toce | H01M 2/0245 429/120 |
| 5,510,203 | A * | 4/1996 | Hamada | H01M 2/0245 429/148 |
| 8,623,541 | B2 | 1/2014 | Choi et al. | |
| 2006/0063067 | A1* | 3/2006 | Kim | H01M 2/021 429/148 |
| 2012/0171553 | A1 | 7/2012 | Guen et al. | |
| 2014/0255747 | A1* | 9/2014 | Cherng | H01M 10/647 429/120 |

FOREIGN PATENT DOCUMENTS

| | | |
|---|---|---|
| KR | 10-0684795 B1 | 2/2007 |
| KR | 10-2009-0095951 A | 9/2009 |
| KR | 10-1222369 B1 | 1/2013 |
| KR | 10-2014-0103196 A | 8/2014 |

OTHER PUBLICATIONS

Korean Patent Abstracts Publication No. KR 10-2006-0104070 A dated Oct. 9, 2006 for KR 10-0684795 B1, 1 page.

* cited by examiner

*Primary Examiner* — Haixia Zhang
(74) *Attorney, Agent, or Firm* — Lewis Roca Rothgerber Christie LLP

(57) ABSTRACT

A rechargeable battery includes: an electrode assembly; a case accommodating the electrode assembly and an electrolyte solution and defining recess portions at edges of the case; a cap plate at an opening of the case; and electrode terminals in the cap plate and coupled to the electrode assembly.

15 Claims, 10 Drawing Sheets

RECHARGEABLE BATTERY AND MODULE THEREOF

CROSS-REFERENCE TO RELATED APPLICATION

This application claims priority to, and the benefit of, Korean Patent Application No. 10-2015-0073083 filed in the Korean Intellectual Property Office on May 26, 2015, the entire contents of which are incorporated herein by reference.

BACKGROUND

1. Field

The present invention relates generally to a rechargeable battery and a rechargeable battery module.

2. Description of the Related Art

A rechargeable battery differs from a primary battery in that the former can be repeatedly charged and discharged, while the latter is incapable of being recharged. Low-capacity rechargeable batteries are used in small portable electronic devices such as mobile phones, notebook computers, and camcorders, while high-capacity rechargeable batteries can be used as a power source for driving motors of a hybrid vehicle, an electric vehicle, and the like.

For example, a rechargeable battery includes: an electrode assembly where charging and discharging operations are performed; a case in which the electrode assembly and an electrolyte solution are accommodated; a cap plate combined to an opening of the case; an electrode terminal provided in the cap plate; and a current collecting member electrically coupling the electrode assembly to the electrode terminal.

As an example, the case may be formed in the shape of a cuboid, one side of which is formed with an opening, the case providing a space in which the rechargeable battery is placed, and providing a part by which the individual rechargeable batteries in the rechargeable battery module can be held from outside thereof.

Because a relatively large unnecessary space is formed inside the case such that the electrolyte solution is collected at the bottom thereof, an absorption rate of the electrolyte solution into the electrode assembly may decrease. In addition, the rechargeable battery module includes a cell barrier member between neighboring rechargeable batteries, thereby increasing a manufacturing cost of the module, and thereby making it difficult to dissipate heat of the case.

The above information disclosed in this Background section is only to enhance the understanding of the background of the invention, and therefore it may contain information that does not form the prior art.

SUMMARY

An aspect of embodiments of the present invention provides a rechargeable battery in which an unnecessary space (e.g., unused space) is reduced or eliminated inside a case. Another aspect of embodiments of the present invention provides a rechargeable battery module that allows individual rechargeable batteries to be effectively held from outside of the rechargeable battery module, and that decreases a manufacturing cost and enhances heat dissipation efficiency of a case.

A rechargeable battery according to one or more exemplary embodiments of the present invention includes: an electrode assembly; a case accommodating the electrode assembly and an electrolyte solution, and defining recess portions at edges of the case; a cap plate at an opening of the case; and electrode terminals in the cap plate and coupled to the electrode assembly.

The case may include: a bottom facing the opening; a pair of wide walls between the bottom and the opening and facing each other; and a pair of narrow walls connecting the pair of wide walls and facing each other. The recess portions at edges of the case may be defined where the wide walls and the narrow walls respectively connect.

The recess portions may be at an entire length of the edges of the case.

The recess portions may be at portions of the edges of the case.

The recess portions may include first recess portions and second recess portions at respective portions of the edges, the first recess portions being spaced from the second recess portions.

Different ones of the recess portions may have different widths in portions of the edges of the case.

The cap plate may define grooves corresponding to the recess portions at edges of the case, and the cap plate may close and seal the opening of the case.

The rechargeable battery may further include current collecting members and uncoated regions of the electrode assembly that are connected to respective ones of the electrode terminals. The current collecting members and the uncoated regions may be connected to each other adjacent the narrow walls and may be between respective ones of the recess portions.

A rechargeable battery module according to one or more exemplary embodiments of the present invention includes: unit cells, each of the unit cells including an electrode assembly, a case accommodating the electrode assembly and an electrolyte solution and defining recess portions at edges of the case, a cap plate at an opening of the case, and electrode terminals in the cap plate and coupled to the electrode assembly; a bus bar coupling respective ones of the electrode terminals of the unit cells; and a coupling member configured to combine the unit cells and located at the recess portions of neighboring unit cells from among the unit cells.

The recess portions may be at respective portions of the edges.

The coupling member may include an upper member for connecting upper end portions of the edges of respective ones of the unit cells, and a lower member spaced from the upper member for connecting lower end portions of the edges of respective ones of the unit cells.

The coupling member may be fitted into the recess portions.

Each of the recess portions may be concave and may have an acute angle, and the coupling member may have a convex coupling portion that is complementary to the acute angle of the recess portion.

The convex coupling portion of the coupling member may be symmetrical and configured to be fitted into the recess portions of the neighboring unit cells.

According to one or more exemplary embodiments of the present invention, the edges of the case include the recess portions, thereby having an effect of reducing or eliminating or substantially eliminating unnecessary space inside the case. Accordingly, the electrolyte solution does not collect or stagnate at the bottom of the case of the rechargeable battery, and an absorption rate of the electrolyte solution into the electrode assembly may increase.

In addition, the coupling member may be combined to the recess portions that are provided in the edges of the case, thereby forming the rechargeable battery module. Accordingly, in the rechargeable battery module, the individual rechargeable batteries can be effectively held from outside of the rechargeable battery module.

In addition, a conventional cell barrier member can be eliminated between the unit cells of the rechargeable battery module. Accordingly, the manufacturing cost of the rechargeable battery module can be reduced, and the unit cells can be separated from each other, thereby facilitating heat dissipation of the case.

DETAILED DESCRIPTION

Figure 1:
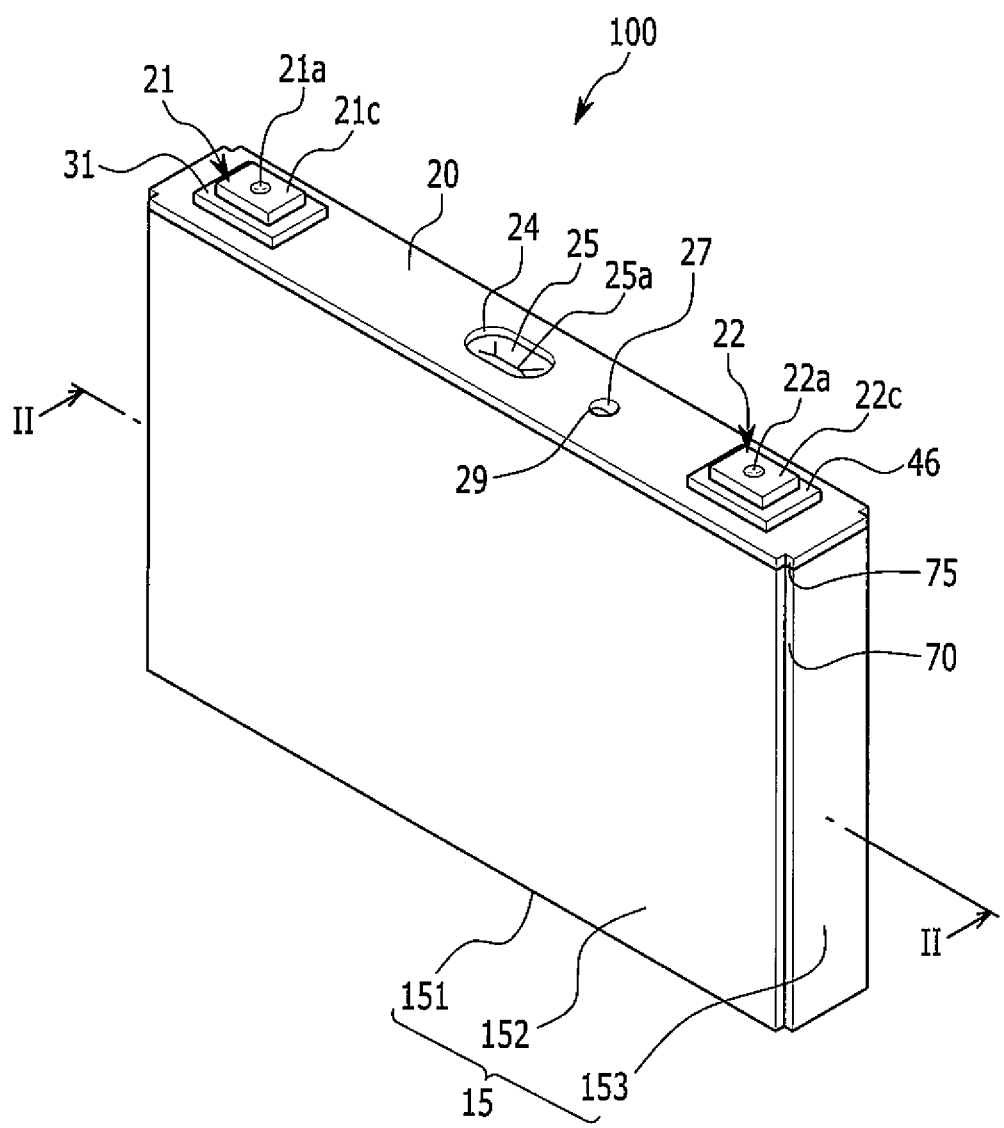
FIG. 1 is a perspective view of a rechargeable battery according to one or more exemplary embodiments of the present invention.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
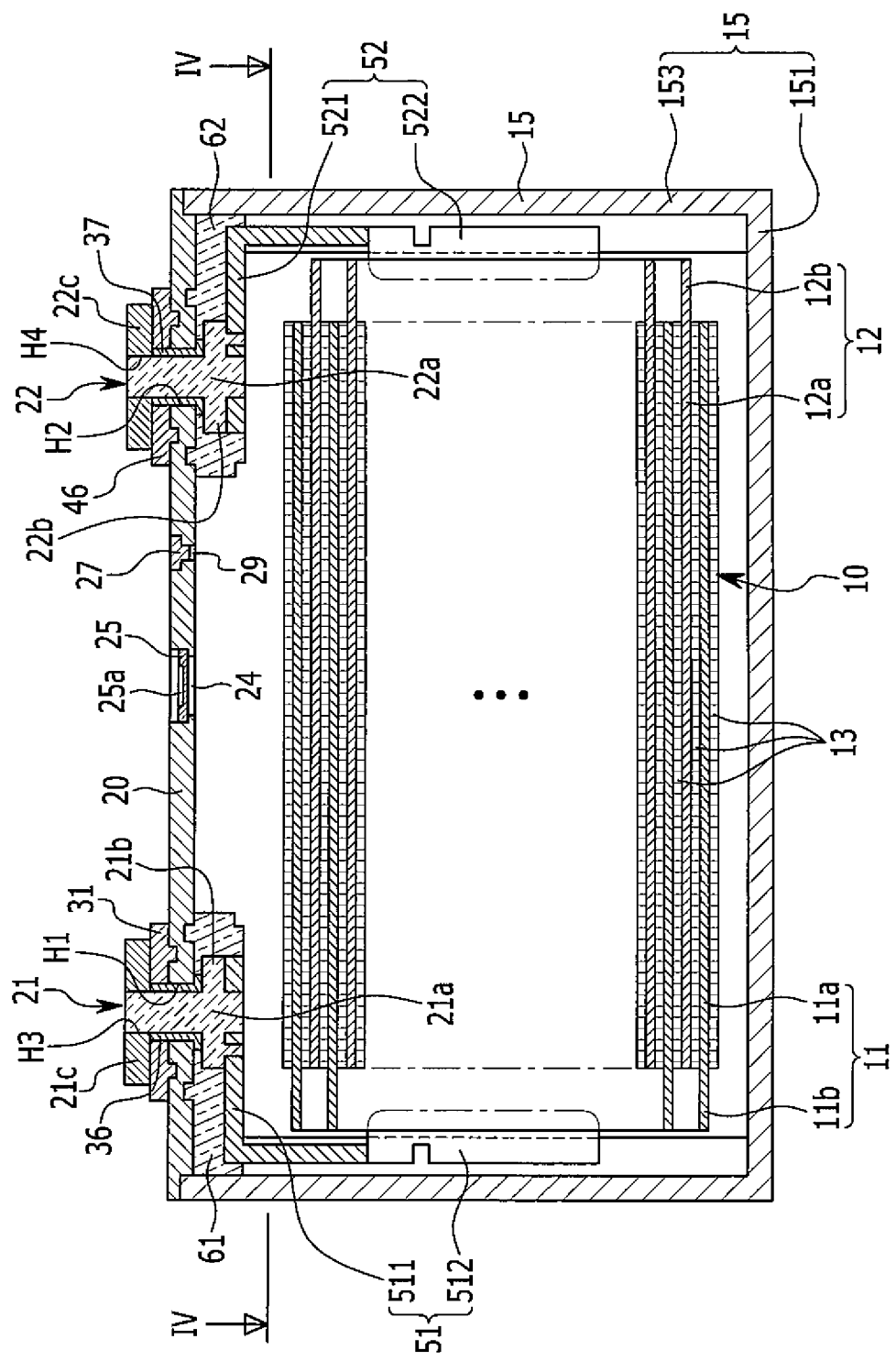
FIG. 2 is a cross-sectional view of the rechargeable battery of FIG. 1 taken along the line II-II of FIG. 1.

FIG. 1 is a perspective view of a rechargeable battery according to one or more exemplary embodiments of the present invention, and FIG. 2 is a cross-sectional view of the rechargeable battery of FIG. 1 taken along the line II-II of FIG. 1. Referring to FIGS. 1 and 2, the rechargeable battery 100 according to one or more exemplary embodiments of the present invention includes: an electrode assembly 10 through which a current may be charged and discharged; a case 15 in which the electrode assembly 10 and an electrolyte solution are placed (or accommodated); a cap plate 20 combined to (or at) an opening of the case 15; and electrode terminals (e.g., negative and positive electrode terminals 21 and 22) provided in the cap plate 20 and connected to (e.g., coupled to or electrically coupled to) the electrode assembly 10.

For example, the electrode assembly 10 may be formed by placing electrodes (e.g., a negative electrode 11 and a positive electrode 12) at opposite surfaces of a separator 13, which serves as an insulator, and spirally winding the negative electrode 11, the separator 13, and the positive electrode 12 in a jelly-roll state.

The negative and positive electrodes 11 and 12 respectively include coated regions 11a and 12a where an active material is coated, and respectively include uncoated regions 11b and 12b, which are formed as exposed current collectors, because an active material is not coated thereon.

The uncoated region 11b of the negative electrode 11 is formed at one end portion of the negative electrode 11 along the wound negative electrode 11. The uncoated region 12b of the positive electrode 12 is formed at one end portion of the positive electrode 12 along the wound positive electrode 12. In addition, the uncoated regions 11b and 12b are respectively disposed at opposite ends of the wound electrode assembly 10.

The case 15 has a substantially cuboid shape that internally provides a space for housing (or accommodating) the electrode assembly 10 and the electrolyte solution. The opening of the case 15 is formed at one side of the cuboid, allowing the electrode assembly 10 to be inserted into an internal space of the cuboid from an outside thereof.

Specifically, the case 15 includes a bottom 151 that faces the opening, a pair of wide walls 152 between the bottom 151 and the opening, the wide walls 152 facing each other, and a pair of narrow walls 153 that connect the pair of wide walls 152 and that face each other.

The cap plate 20 is provided at (or in) the opening of the case 15, and closes and seals the case 15. For example, the case 15 and the cap plate 20 may be welded to each other because they may be made of an aluminum material. That is, after inserting the electrode assembly 10 into the case 15, the cap plate 20 may be welded to the opening of the case 15.

In addition, the cap plate 20 has one or more openings therethrough, and includes, for example, terminal holes H1 and H2, a vent hole 24, and an electrolyte injection opening 29. The negative and positive electrode terminals 21 and 22 are respectively provided in the terminal holes H1 and H2 of the cap plate 20 to be electrically coupled to the electrode assembly 10.

That is, the negative and positive electrode terminals 21 and 22 are respectively electrically coupled to the negative and positive electrodes 11 and 12 of the electrode assembly 10 via current collecting members 51 and 52. Accordingly, the electrode assembly 10 (e.g., electrical connections to the electrode assembly 10) may be drawn out of the case 15 through the negative and positive electrode terminals 21 and 22, which extend or penetrate through the cap plate 20 (e.g., which extend through the terminal holes H1 and H2 of the cap plate 20, respectively).

The negative and positive electrode terminals 21 and 22 respectively include plate terminals 21c and 22c that are located at an exterior of the cap plate 20 in accordance with, or corresponding to, the terminal holes H1 and H2, and respectively include rivet terminals 21a and 22a that are respectively electrically coupled to the current collecting members 51 and 52 and that are respectively riveted to the plate terminals 21c and 22c by respectively penetrating the terminal holes H1 and H2.

The plate terminals 21c and 22c include through-holes H3 and H4, respectively. After penetrating the corresponding terminal holes H1 and H2, upper ends of the rivet terminals 21a and 22a are inserted into the corresponding through-holes H3 and H4. The negative and positive electrode terminals 21 and 22 further include flanges 21b and 22b, respectively, that may be formed integrally with, and wider than, the rivet terminals 21a and 22a inside the cap plate 20.

An external insulating member 31 located adjacent the negative terminal 21 between the plate terminal 21c and the cap plate 20 electrically insulates the plate terminal 21c from the cap plate 20. That is, the cap plate 20 is electrically insulated from the electrode assembly 10 and the current collecting member 51 of the negative electrode 11.

By combining the insulating member 31 and the plate terminal 21c to an upper end of the rivet terminal 21a and then riveting or welding the upper end of the rivet terminal 21a, the insulating member 31 and the plate terminal 21c are fastened to the upper end of the rivet terminal 21a. The plate terminal 21c is provided at an exterior of the cap plate 20 while the insulating member 31 is located therebetween.

A conductive top plate 46 located at the positive electrode terminal 22 between the plate terminal 22c and the cap plate 20 electrically connects the plate terminal 22c and the cap plate 20 to each other. That is, the cap plate 20 is electrically coupled to the electrode assembly 10 and the current collecting member 52 of the positive electrode 12.

By combining the top plate 46 and the plate terminal 22c to an upper end of the rivet terminal 22a and then riveting or welding the upper end of the rivet terminal 22a, the top plate 46 and the plate terminal 22c are fastened to the upper end of the rivet terminal 22a. The plate terminal 22c is provided at an exterior of the cap plate 20 with the top plate 46 located therebetween.

Gaskets 36 and 37 are respectively provided between the rivet terminals 21a and 22a of the negative and positive electrode terminals 21 and 22 and inner surfaces of the terminal holes H1 and H2 of the cap plate 20, thereby sealing and electrically insulating the rivet terminals 21a and 22a and the cap plate 20.

The gaskets 36 and 37 further extend between the flanges 21b and 22b and an inner surface of the cap plate 20, respectively, to further seal and electrically insulate the flanges 21b and 22b and the cap plate 20. That is, by providing the negative and positive electrode terminals 21 and 22 in the cap plate 20, the gaskets 36 and 37 prevent or reduce the likelihood of leakage of the electrolyte solution via the terminal holes H1 and H2.

The current collecting members 51 and 52 respectively electrically couple the negative and positive electrode terminals 21 and 22 to the negative and positive terminals 11 and 12 of the electrode assembly 10. For example, the current collecting members 51 and 52 respectively include terminal connecting portions 511 and 521 that are respectively connected to the negative and positive electrode terminals 21 and 22, and electrode connecting portions 512 and 522 that are respectively connected to the uncoated regions 11b and 12b of the electrode assembly 10.

That is, by combining the terminal connecting portions 511 and 521 with lower ends of the rivet terminals 21*a* and 22*a*, respectively, and by caulking the lower ends thereof, the terminal connecting portions 511 and 521 are respectively supported by the flanges 21*b* and 22*b* and are connected to the lower ends of the rivet terminals 21*a* and 22*a*.

Insulating members 61 and 62 are respectively provided between the terminal connecting portions 511 and 521 of the current collecting members 51 and 52 and the cap plate 20, and respectively electrically insulate the terminal connecting portions 511 and 521 from the cap plate 20. In addition, one side of each of the insulating members 61 and 62 is combined with the cap plate 20, while the other side thereof respectively encloses the terminal connecting portions 511 and 521, the rivet terminals 21*a* and 22*a*, and the flanges 21*b* and 22*b*, thereby stabilizing a connection structure therebetween.

The vent hole 24 is closed and sealed by a vent plate 25 so as to discharge internal gas and internal pressure generated when charging and discharging the rechargeable battery 100. The vent plate 25 ruptures to open the vent hole 24 when the internal pressure of the rechargeable battery 100 reaches a given pressure. The vent plate 25 is provided with a notch 25*a* that is configured to allow the rupture of the vent plate 25.

After combining the cap plate 20 to the case 15, the electrolyte injection opening 29 allows the electrolyte solution to be injected into the case 15. After the injection of the electrolyte solution, the electrolyte injection opening 29 is sealed by a sealing cap 27.

Figure 3:
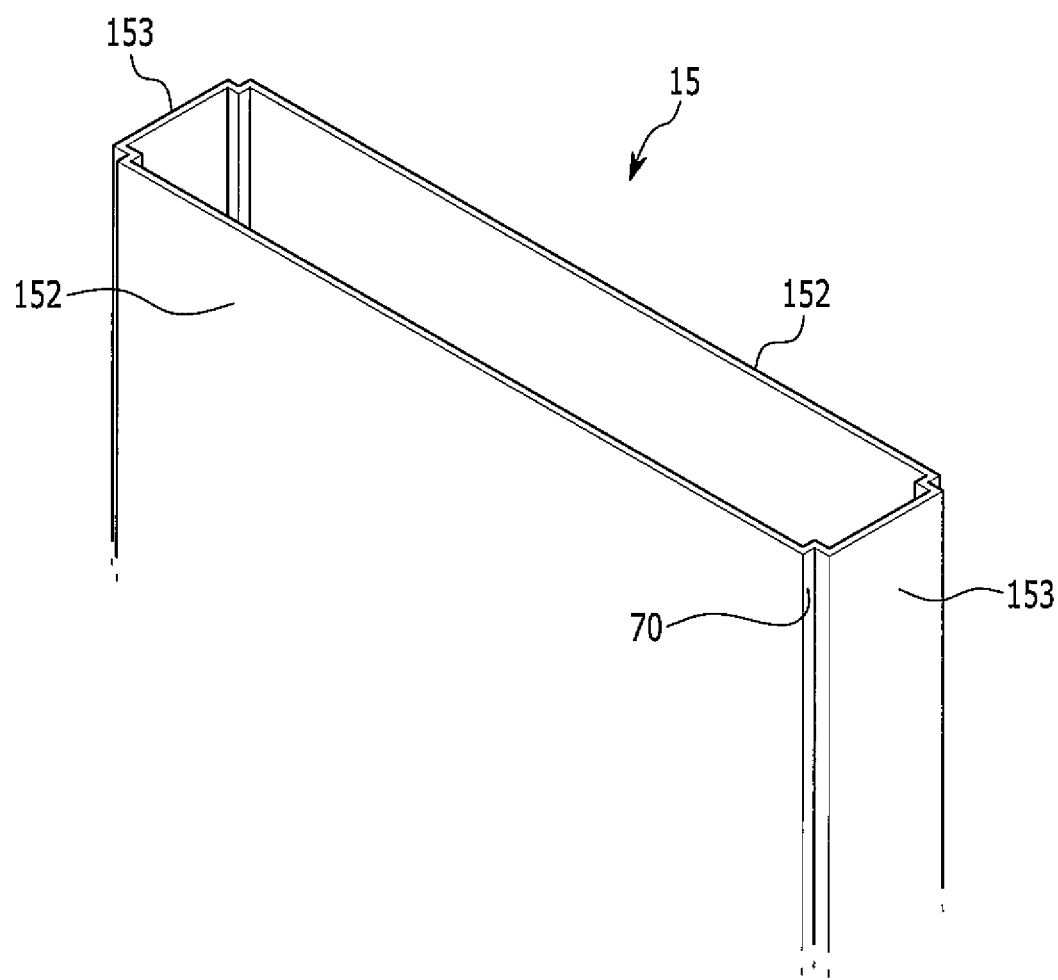
FIG. 3 is a partial perspective view of a case of the rechargeable battery of FIG. 1.

FIG. 3 is a partial perspective view of the case of FIG. 1. Referring to FIGS. 1 to 3, the case 15 further includes recess portions 70 that are depressed inwardly from edges/corners of the case 15. The recess portions 70 may be formed along the edges/corners of the case 15 that respectively connect the wide walls 152 and the narrow walls 153. In one or more embodiments, the recess portions 70 may span an entire length of the edges/corners in a length direction of the case 15.

The cap plate 20 is formed with a groove 75 that corresponds to the recess portion 70, thereby closing and sealing the opening of the case 15. That is, after the opening is closed and sealed, the groove 75 of the cap plate 20 is aligned with, and continuously extends in the length direction with, the recess portion 70 of the case 15.

Figure 4:
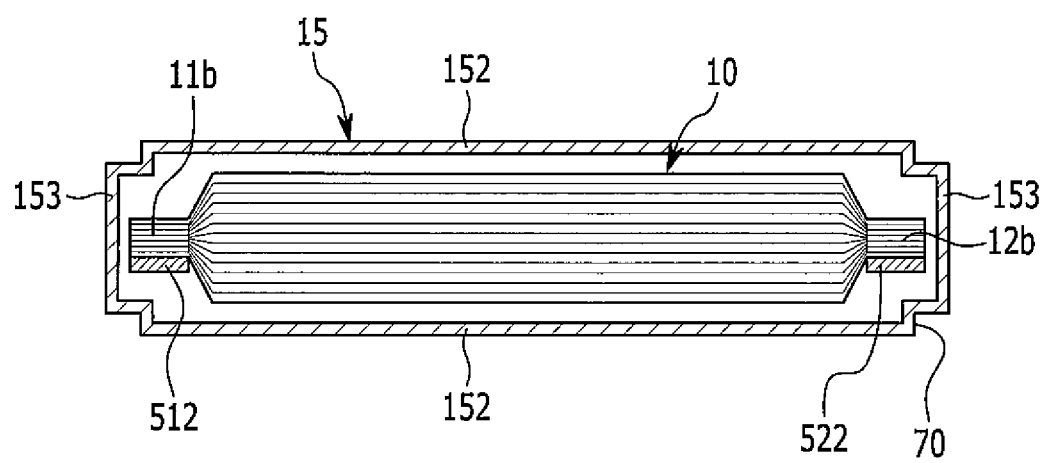
FIG. 4 is a cross-sectional view of the rechargeable battery of FIG. 1 taken along the line IV-IV of FIG. 2.

FIG. 4 is a cross-sectional view of the rechargeable battery of FIG. 2 taken along the line IV-IV. Referring to FIGS. 3 and 4, the recess portions 70 are provided at the four edges/corners where the walls 152 and 153 of the case 15 respectively meet.

The current collecting members 51 and 52 are respectively electrically coupled to the uncoated regions 11*b* and 12*b* of the electrode assembly 10. For example, the current collecting members 51 and 52 may be respectively connected to the uncoated regions 11*b* and 12*b* by welding. The electrode connecting portions 512 and 522 of the current collecting members 51 and 52 are respectively connected to the uncoated regions 11*b* and 12*b*, such that they are in proximity to the narrow walls 153 and are each between a respective pair of the recess portions 70 adjacent a corresponding one of the narrow walls 153.

In the present embodiment, the recess portions 70 reduce a space (e.g., an unused space) between the electrode assembly 10 and the inner wall of the case 15. That is, the case 15 may have reduced internal space at the edges by an amount of depression corresponding to the recess portions 70 as compared with a conventional case in which an internal space is vertically set at edges.

That is, as a space (e.g., an unnecessary space) is reduced inside the case 15, the electrolyte solution is less likely to collect or stagnate at or around the bottom 151, and is more likely to be absorbed (or maximally absorbed) by the electrode assembly 10. When the same amount of the electrolyte solution is injected, a level of the electrolyte solution inside the case 15 increases, and an empty space between the negative and positive electrodes 11 and 12 is occupied (e.g., maximally occupied) by the electrolyte solution.

Accordingly, an absorption rate of the electrolyte solution into the electrode assembly 10 may increase, so a solid electrolyte interface (SEI) layer may be more uniformly formed in an initial activation process of the rechargeable battery 100.

Hereinafter, various exemplary embodiments of the present invention are described. A description of components that are the same as those described above may be omitted, while a description of different components is given.

Figure 5:
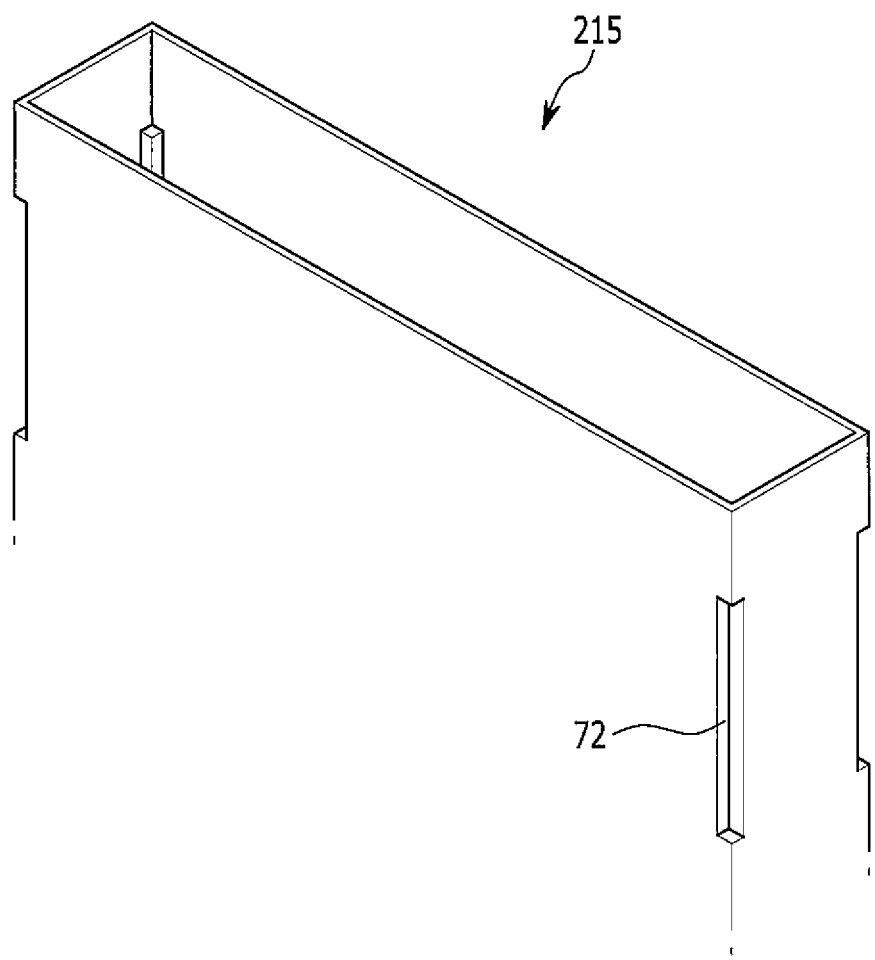
FIG. 5 is a partial perspective view of a case of a rechargeable battery according to one or more exemplary embodiments of the present invention.

FIG. 5 is a partial perspective view of a case applicable to a rechargeable battery according to one or more exemplary embodiments of the present invention. Referring to FIG. 5, in the rechargeable battery according to one or more exemplary embodiments of the present invention, a recess portion 72 may be formed at (or in) a portion (or part) of an edge of a case 215 in the length direction.

In some embodiments, the recess portion 72 may be formed at any height (in the length direction) of the case 215, except at an opening of the case 215. Accordingly, a structure for combining the opening of the case 215 and the cap plate 20 may be relatively simple, and a manufacturing cost and a quality cost may therefore be reduced.

Figure 6:
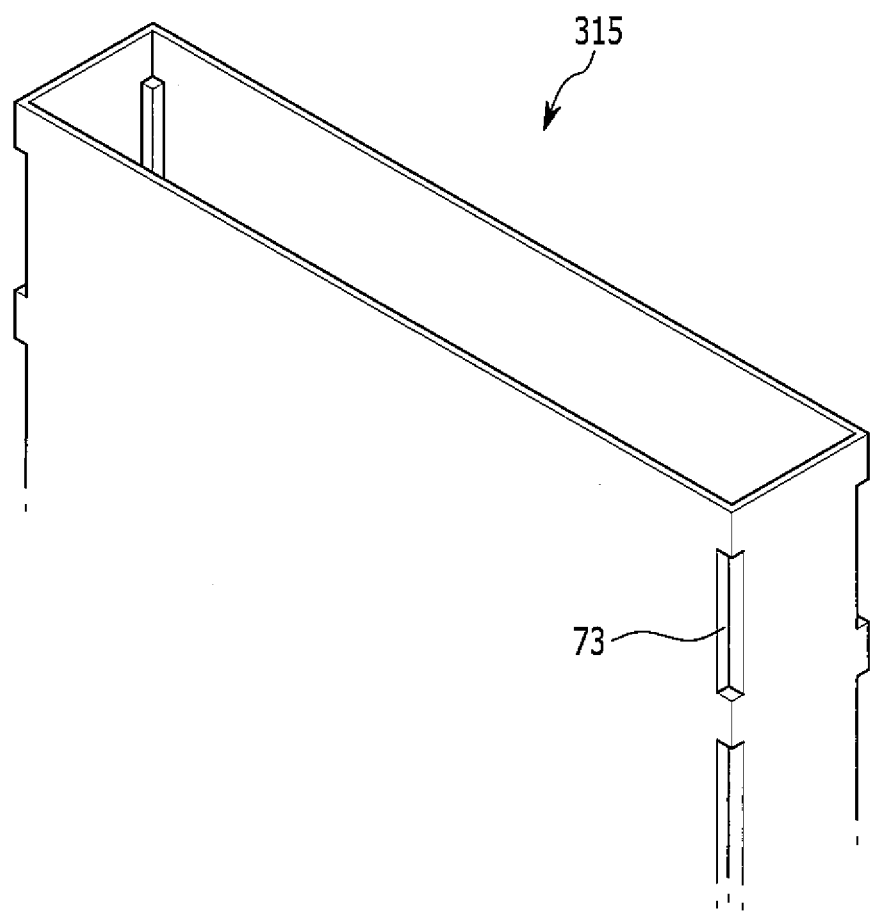
FIG. 6 is a partial perspective view of a case of a rechargeable battery according to one or more exemplary embodiments of the present invention.

FIG. 6 is a partial perspective view of a case applicable to a rechargeable battery according to one or more exemplary embodiments of the present invention. Referring to FIG. 6, in the rechargeable battery according to one or more exemplary embodiments of the present invention, a plurality of recess portions 73 may be formed at respective portions of an edge of a case 315 in the length direction of the case 315, the recess portions 73 being separated (or spaced) from each other.

In one or more exemplary embodiments, the case 315 may include a plurality of recess portions 73, for example, the case 315 may include two recess portions 73 formed in each edge/corner of the case 315. In some embodiments, the recess portions 73 may be formed shorter in length such that they have a variety of shapes or sizes. The plurality of recess portions 73 may effectively eliminate or reduce a space (e.g., an unnecessary space) inside the case 315 in which the electrode assembly is placed.

Figure 7:
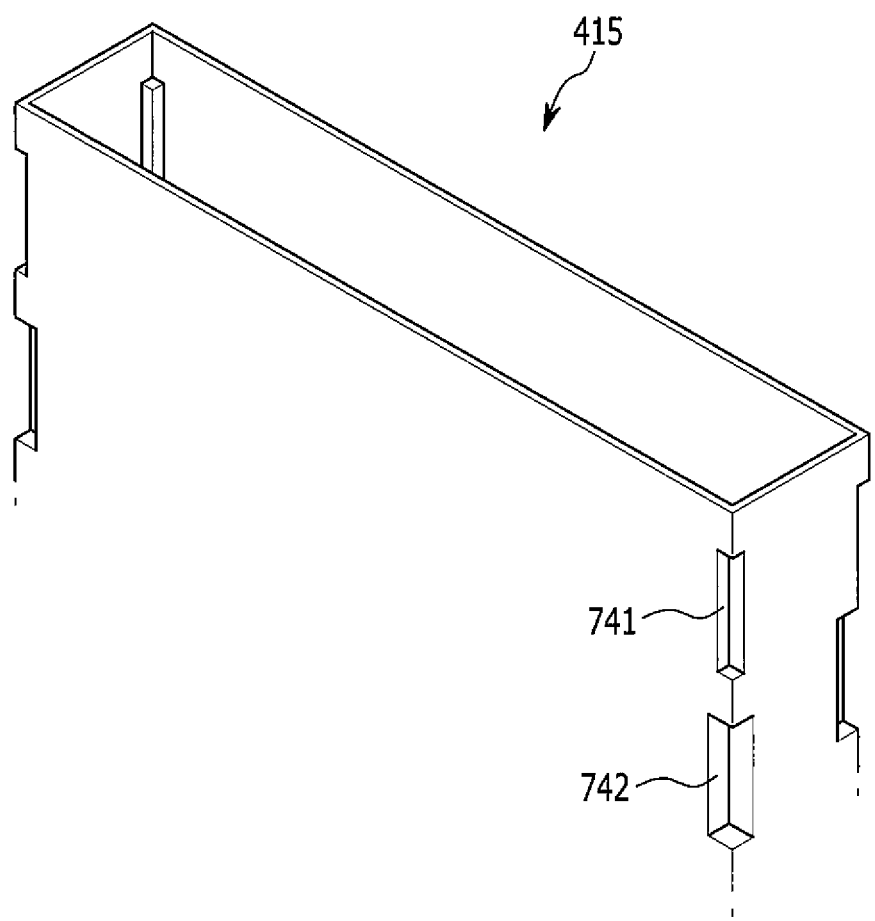
FIG. 7 is a partial perspective view of a case of a rechargeable battery according to one or more exemplary embodiments of the present invention.

FIG. 7 is a partial perspective view of a case applicable to a rechargeable battery according to one or more exemplary embodiments of the present invention. Referring to FIG. 7, in the rechargeable battery according to one or more exemplary embodiments of the present invention, a plurality of recess portions 741 and 742 may be formed in a portion of an edge/corner of a case 415 in a length direction of the case 415 while being separated (or spaced apart) from each other, and may also be respectively formed such that they have different widths.

In one or more exemplary embodiments of the present invention, the recess portions 741 and 742 may have different widths. For example, a width of a first recess portion (e.g., an upper recess portion) 741 may be formed smaller than that of a second recess portion (e.g., a lower recess portion) 742. The recess portions 741 and 742 may be formed to have shorter lengths at the edge such that they have different widths (e.g., a variety of widths).

A space (e.g., an unnecessary space) may be reduced, eliminated, or substantially eliminated by the recess portions 741 and 742, some or all of the recess portions 741 and 742 having different widths. In addition, as illustrated in FIG. 7, the recess portions 741 and 742 may be separated from each other. In some embodiments, the recess portions may be formed such that they have different widths, but are adjacent or connected while having a step therebetween.

Figure 8:
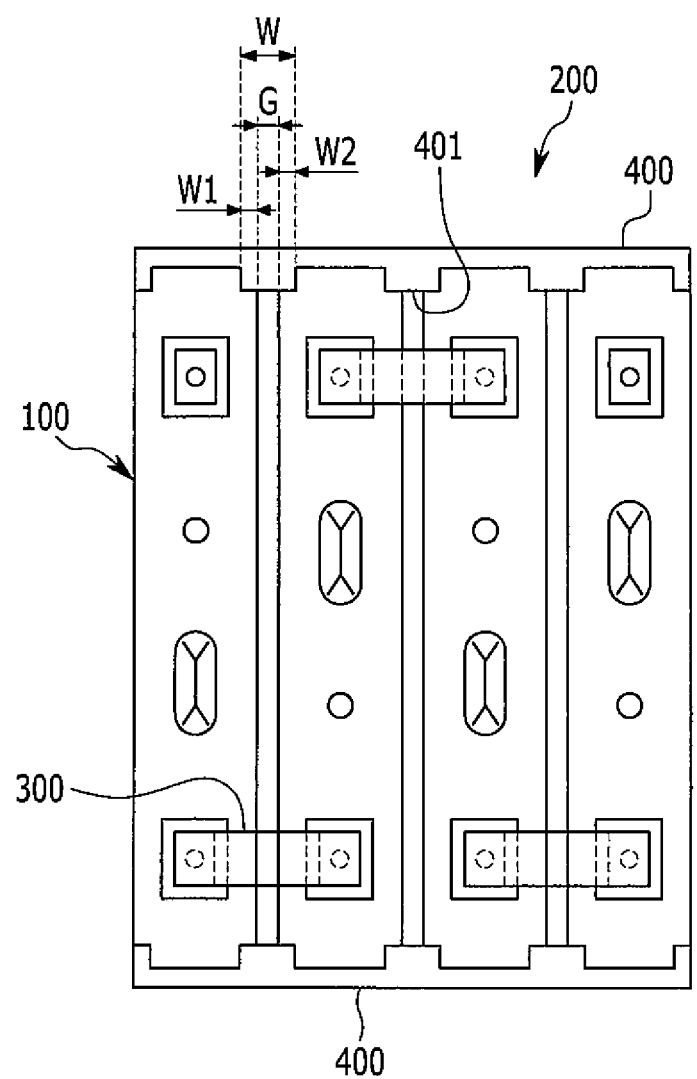
FIG. 8 is a top plan view of a rechargeable battery module according to one or more exemplary embodiments of the present invention.
Figure 9:
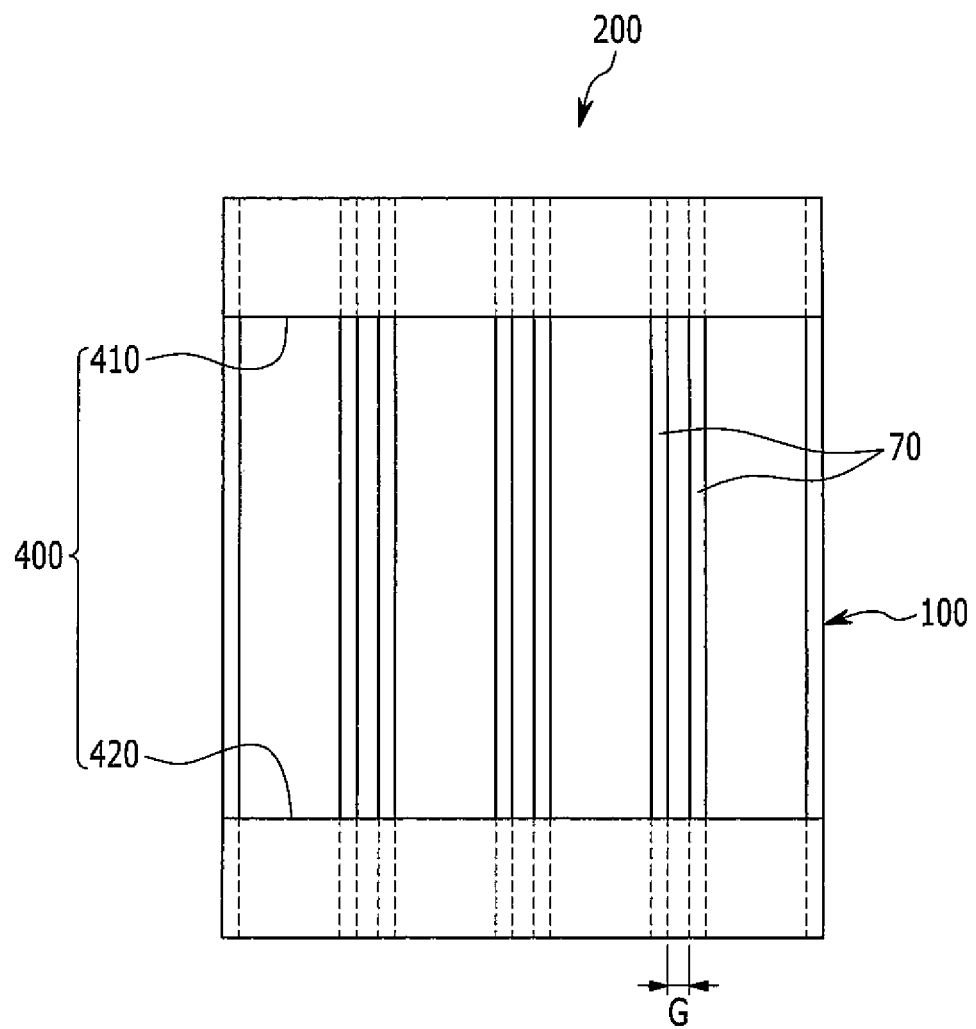
FIG. 9 is a front view of the rechargeable battery module of FIG. 8.

FIG. 8 is a top plan view of a rechargeable battery module according to one or more exemplary embodiments of the present invention, and FIG. 9 is a front view of the rechargeable battery module of FIG. 8. Referring to FIGS. 8 and 9, the rechargeable battery module 200 of the current exemplary embodiment includes a plurality of unit cells 100 (e.g., a plurality of rechargeable batteries 100, illustrated in FIGS. 1 to 4).

The rechargeable battery module 200 includes bus bars 300 that electrically couple respective ones of the electrode terminals 21 and 22 of the plurality of unit cells 100, and coupling members 400 that are configured to be combined to the recess portions 70 of neighboring unit cells 100 from among the plurality of unit cells 100.

As an example, the recess portion 70 may be formed across all edges/corners of the case 15 of each of the unit cells 100 in a length direction thereof. A single recess portion or a plurality of recess portions may be partially formed at the edge/corner along the length direction of the case 15.

In one or more embodiments, the bus bar 300 may serially connect the negative and positive terminals 21 and 22 of the neighboring unit cells 100. In some embodiments, the bus bar may connect the unit cells 100 in parallel. That is, the bus bar 300 electrically couples the neighboring unit cells 100 in the rechargeable battery module 200.

The coupling member 400 may be fitted (e.g., forcedly fitted, tightly fitted, or closely fitted) into the recess portion 70 to be combined thereto. That is, the coupling member 400 mechanically connects the unit cells 100 in the rechargeable battery module 200.

In addition, the coupling member 400 includes convex coupling portions 401 that correspond to, and are combined with, respective ones of the recess portions 70. A width W of the convex coupling portions 401 corresponds to widths W1 and W2 of the recess portion 70 and to a gap G between the unit cells 100.

Depending on the widths W1 and W2 of the recess portion 70 and the width W of the convex coupling portion 401, the gap G between the neighboring unit cells 100 is determined. The convex coupling portion 401 and the gap G between the unit cells 100 may allow removal of a conventional cell barrier member, and may allow air flow between the unit cells 100, thereby improving heat dissipation efficiency of the case 15 when charging and discharging the unit cells 100.

As an example, the coupling member 400 may include an upper member 410 that connects the unit cells 100 at upper end portions of the edges/corners, and a lower member 420 that is separated from the upper member 410 and that connects the unit cells 100 at lower end portions of the edges.

Because the upper and lower members 410 and 420 are combined with the unit cells 100 at the recess portions 70 of the case 15, which are at upper and lower parts of the unit cells 100, a fastening force of the unit cells 100 can be improved in the rechargeable battery module 200.

Figure 10:
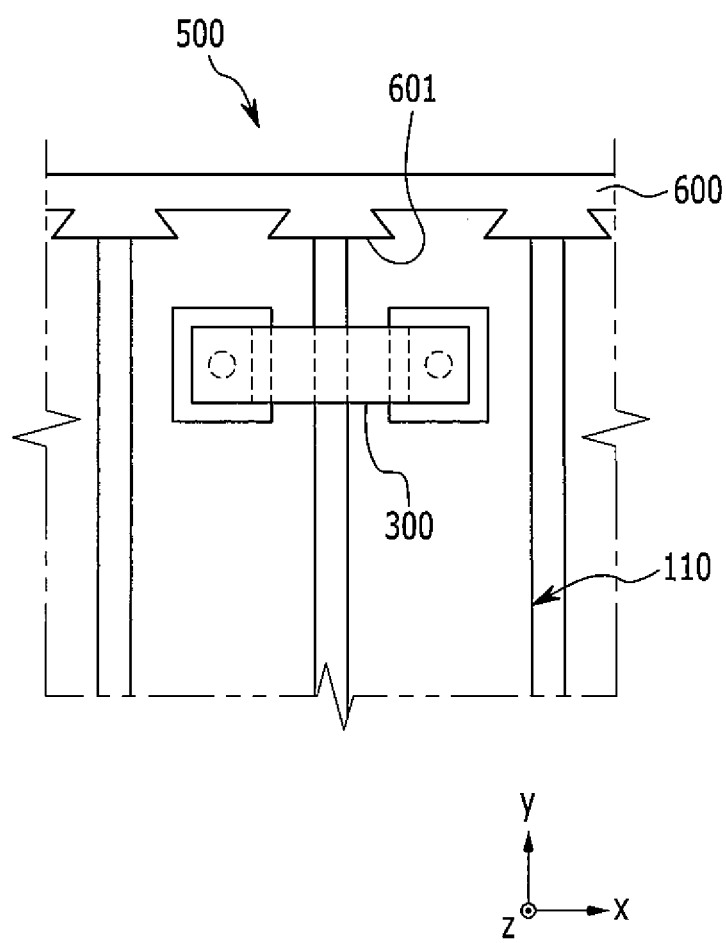
FIG. 10 is a partial top plan view of a rechargeable battery module according to one or more exemplary embodiments of the present invention.

FIG. 10 is a partial top plan view of a rechargeable battery module according to one or more exemplary embodiments of the present invention. Referring to FIG. 10, in a rechargeable battery module 500, a recess portion is concavely formed with an acute angle, and a coupling member 600 includes a convex coupling portion 601 that is formed with an acute angle to be combined with the recess portions of the unit cells 110.

That is, the convex coupling portions 601 of the coupling member 600 are configured to be slidably combined with respective ones of the recess portions of the unit cells 110 in a z-axis direction (or in the length direction). Accordingly, the coupling member 600 and the convex coupling portion 601 may be robustly combined while not being separated from the recess portions of the unit cells 110 in a y-axis direction.

The convex coupling portion 601 has a horizontally symmetrical structure such that it is combined with the recess portions of neighboring unit cells 110. Accordingly, the convex coupling portion 601 can have a uniform fastening force for the neighboring unit cells 110.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

| Description of Some of the Symbols | |
|---|---|
| 10: electrode assembly | 11: negative electrode |
| 11a, 12a: coated region | 11b, 12b: uncoated region |
| 12: positive electrode | 13: separator |
| 15, 215, 315, 415: case | 20: cap plate |
| 21, 22: negative, positive electrode terminal (electrode terminal) | |
| 21a, 22a: rivet terminal | 21b, 22b: flange |
| 21c, 22c: plate terminal | 24: vent hole |
| 25: vent plate | 27: sealing cap |
| 29: electrolyte injection opening | 31: external insulating member |
| 36, 37: gasket | 46: top plate |
| 51, 52: current collecting member | 61, 62: insulating member |
| 70, 72, 73, 741, 742: recess portion | |
| 75: groove | 100, 110: rechargeable battery (unit cell) |
| 151: bottom wall | 152: wide wall |
| 153: narrow wall | 200, 500: rechargeable battery module |
| 300: bus bar | 400, 600: coupling member |
| 401, 601: convex coupling portion | 410, 420: upper, lower member |
| 511, 521: terminal connecting portion | 512, 522: electrode connecting portion |

| Description of Some of the Symbols | |
|---|---|
| G: gap between unit cells | H1, H2: terminal hole |
| H3, H4: through-hole | W: width of convex coupling portion |
| W1, W2: widths of recess portion | |

What is claimed is:

1. A rechargeable battery comprising:
an electrode assembly;
a case accommodating the electrode assembly and an electrolyte solution, and defining recess portions at edges of the case, the case comprising:
a pair of wide walls facing each other; and
a pair of narrow walls facing each other;
a cap plate at an opening of the case; and
electrode terminals in the cap plate and coupled to the electrode assembly,
wherein a distance between respective inner surfaces of the wide walls of the case is less at the recess portions than at regions away from the recess portions, and
wherein the recess portions are depressed inwardly from the edges of the case, and are configured to reduce a space between the electrode assembly and the inner surfaces of the wide walls of the case.

2. The rechargeable battery of claim 1,
wherein the case further comprises a bottom facing the opening,
wherein the pair of wide walls is between the bottom and the opening,
wherein the pair of narrow walls connects the pair of wide walls, and
wherein the recess portions at edges of the case are defined where the wide walls and the narrow walls respectively connect.

3. The rechargeable battery of claim 2, wherein the recess portions are at an entire length of the edges of the case.

4. The rechargeable battery of claim 2, wherein the recess portions are at portions of the edges of the case.

5. The rechargeable battery of claim 2, wherein the recess portions comprise first recess portions and second recess portions at respective portions of the edges, the first recess portions being spaced from the second recess portions.

6. The rechargeable battery of claim 2, wherein different ones of the recess portions have different widths in portions of the edges of the case.

7. The rechargeable battery of claim 2, wherein the cap plate defines grooves corresponding to the recess portions at edges of the case, the cap plate closing and sealing the opening of the case.

8. The rechargeable battery of claim 2 further comprising current collecting members and uncoated regions of the electrode assembly connected to respective ones of the electrode terminals, the current collecting members and the uncoated regions being connected to each other adjacent the narrow walls and between respective ones of the recess portions.

9. The rechargeable battery of claim 1, wherein at least a portion of the electrolyte solution is accommodated in a space between the inner surfaces of the wide walls of the case at the recess portions.

10. A rechargeable battery module comprising:
unit cells, each of the unit cells comprising:
an electrode assembly;
a case accommodating the electrode assembly and an electrolyte solution, and defining recess portions at edges of the case, the case comprising:
a pair of wide walls facing each other; and
a pair of narrow walls facing each other;
a cap plate at an opening of the case; and
electrode terminals in the cap plate and coupled to the electrode assembly;
a bus bar coupling respective ones of the electrode terminals of the unit cells; and
a coupling member configured to combine the unit cells and located at the recess portions of neighboring unit cells from among the unit cells,
wherein in each of the unit cells, a distance between respective inner surfaces of the wide walls of the case is less at the recess portions than at regions away from the recess portions, and
wherein in each of the unit cells, the recess portions are depressed inwardly from the edges of the case, and the recess portions are configured to reduce a space between the electrode assembly and the inner surfaces of the wide walls of the case.

11. The rechargeable battery module of claim 10, wherein the recess portions are at respective portions of the edges.

12. The rechargeable battery module of claim 11, wherein the coupling member comprises:
an upper member for connecting upper end portions of the edges of respective ones of the unit cells, and
a lower member spaced from the upper member for connecting lower end portions of the edges of the respective ones of the unit cells.

13. The rechargeable battery module of claim 10, wherein the coupling member is fitted into the recess portions.

14. The rechargeable battery module of claim 10, wherein each of the recess portions is concave and has an acute angle, and
wherein the coupling member has a convex coupling portion that is complementary to the acute angle of a corresponding one of the recess portions.

15. The rechargeable battery module of claim 14, wherein the convex coupling portion of the coupling member is symmetrical and configured to be fitted into the corresponding one of the recess portions of the neighboring unit cells.

* * * * *